April 27, 1965  G. B. FOSTER  3,180,136
CONTINUOUSLY CALIBRATED DISPLACEMENT MEASURING TRANSDUCER SYSTEM
Filed June 16, 1960  7 Sheets-Sheet 1

INVENTOR
George B. Foster,
BY Diggins & LeBlanc,
ATTORNEYS

April 27, 1965    G. B. FOSTER    3,180,136
CONTINUOUSLY CALIBRATED DISPLACEMENT MEASURING TRANSDUCER SYSTEM
Filed June 16, 1960    7 Sheets-Sheet 2

INVENTOR
George B. Foster,
BY Diggins & Le Blanc
ATTORNEYS

April 27, 1965 G. B. FOSTER 3,180,136
CONTINUOUSLY CALIBRATED DISPLACEMENT MEASURING TRANSDUCER SYSTEM
Filed June 16, 1960 7 Sheets-Sheet 3

INVENTOR
George B. Foster,

BY Diggins + Le Blanc
ATTORNEYS

April 27, 1965   G. B. FOSTER   3,180,136
CONTINUOUSLY CALIBRATED DISPLACEMENT MEASURING TRANSDUCER SYSTEM
Filed June 16, 1960   7 Sheets-Sheet 4

INVENTOR
George B. Foster,
BY Diggins + LeBlanc
ATTORNEYS

April 27, 1965 G. B. FOSTER 3,180,136
CONTINUOUSLY CALIBRATED DISPLACEMENT MEASURING TRANSDUCER SYSTEM
Filed June 16, 1960 7 Sheets-Sheet 5

INVENTOR
George B. Foster,

BY Diggins & Le Blanc
ATTORNEYS

United States Patent Office 3,180,136
Patented Apr. 27, 1965

3,180,136
CONTINUOUSLY CALIBRATED DISPLACEMENT
MEASURING TRANSDUCER SYSTEM
George B. Foster, Worthington, Ohio, assignor to Raydata
Corporation, Worthington, Ohio, a corporation of Ohio
Filed June 16, 1960, Ser. No. 36,662
32 Claims. (Cl. 73—71.4)

This invention relates to vibration transducing systems and more particularly relates to non-contacting vibration transducing systems having unique calibrating and standardizing arrangements.

Numerous different types of transducing devices have been developed for translating mechanical vibration into an electrical signal which can be utilized to actuate amplitude and frequency measuring and analyzing devices of varying degrees of complexity. Generally speaking, such transducers have been contact devices responsive to the time derivative of the displacement between two elements of a system such as an inductance and a magnetic field. In a typical arrangement, one element is mounted seismically in a transducer body adapted to be affixed to the vibrating body whose motion is to be analyzed.

While such systems are widely utilized they are subject to a number of well understood disadvantages. Among these are the inability of the system to respond to low frequencies, including zero frequency, low signal output, and the necessity for the transducer to be in contact with the device under observation. In numerous instances the addition of the mass of the transducer alters the pattern of vibration and thereby destroys the validity of the data which is derived.

As an attempt to overcome these disadvantages, it has been proposed to employ non-contacting vibration transducer arrangements utilizing reflected light or a magnetic field to sense the vibration of the element under study. However, while systems of this type are theoretically feasible, calibration and standardization difficulties have rendered them mere laboratory phenomena rather than commercial tools.

According to the present invention, it has now been found that non-contacting vibration transducers can be utilized in a transducing system of practical commercial utility when such transducers are provided with a unique calibration and standardization arrangement as an integral feature of the transducing system. Not only are the transducers commercially usable but they overcome a large number of the disadvantages and drawbacks encountered in the use of non-contacting transducers.

In a system constructed according to the invention, a transducer is provided which is sensitive to some form of wave or field energy to produce an output voltage which is a function of a variation in this energy caused by vibration of some object under study. If the relation of this output voltage to the displacement of the vibrating object is accurately known, it will be obvious that accurate vibration measurement and analysis is possible. Numerous expedients have been proposed for providing and maintaining an adequately accurate transducer calibration, but, so far as is known, none of these conventional procedures has been fully usable in a non-contacting transducer system.

As previously described, the vibration under study produces a displacement of the object being investigated and this in turn causes an energy variation which produces an output voltage. According to the invention, the transducer and associated circuitry is constructed in such a manner that it is possible to vary the relationship between the energy variation and the output voltage. A means is then provided for imparting a known and constant standardizing displacement to the transducer whereby the transducer will produce a fixed standardizing output voltage if the object under study is stationary. This standardizing voltage is compared to a fixed and known reference voltage and control circuitry is provided to vary the relationship between the energy variation actuating the transducer and the transducer output voltage to maintain the output voltage equal to the reference voltage. Under such circumstances a constant and known functional relationship is created between the vibration actuating the transducer and the transducer output.

While the foregoing description discusses the object under study as being stationary, this is for purposes of clarity only, and it will be readily apparent that vibration and displacement of the object will not vitiate or otherwise affect the standardization and calibration function. With the transducer operating in this manner it is possible to vary the spacing between the transducer and the object and to vary the disposition of the transducer relative to the object, without affecting the ability of the transducer to produce a continuously calibrated output signal. In short, the transducer system of the invention provides a universal non-contacting transducer which can be used to measure or analyze the vibration of any vibrating object without the necessity of calibrating or standardizing the transducer for the particular job.

It is accordingly a primary object of the present invention to provide an improved non-contacting vibration transducer system.

It is another object of the invention to provide an improved non-contacting vibration transducer system wherein constant standardization of the transducer device is possible.

It is another object of the invention to provide an improved vibration transducer system utilizing a detection device sensitive to wave or field energy wherein the detection device itself is capable of being operated upon to produce a standardization signal.

It is still a further object of the invention to provide an improved vibration transducer system having a calibration and standardization arrangement susceptible of use with various types of wave or field energy as the signal transferring medium.

It is another object of the invention to provide a non-contacting transducer wherein the spacing and disposition of the transducer relative to the object under study is not critical.

It is another object of the present invention to provide a universally calibrated non-contacting transducer capable of providing a calibrated signal by mere association with the object under study.

These and further objects and advantages of the invention will become more apparent upon reference to the following specification and claims and the appended drawings wherein:

3

Figure 8:
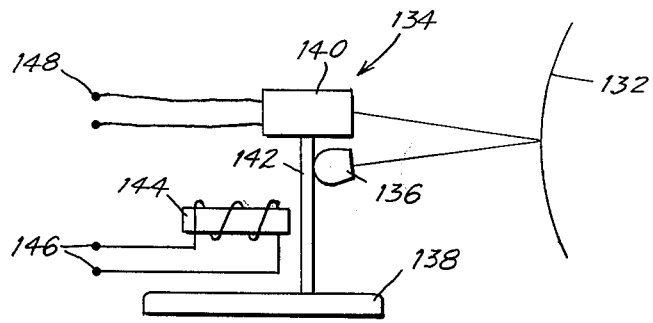
Figure 9:
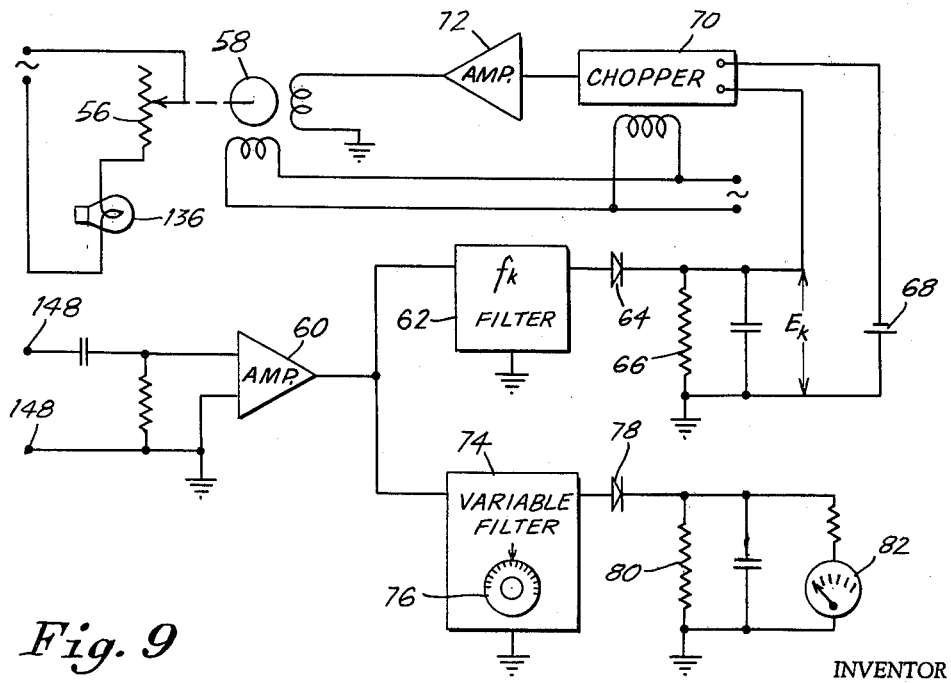
Figure 10:
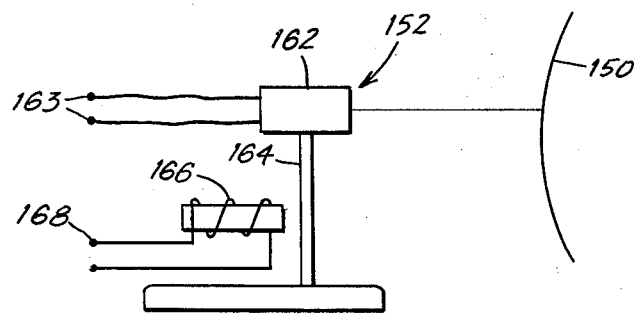
Figure 11:
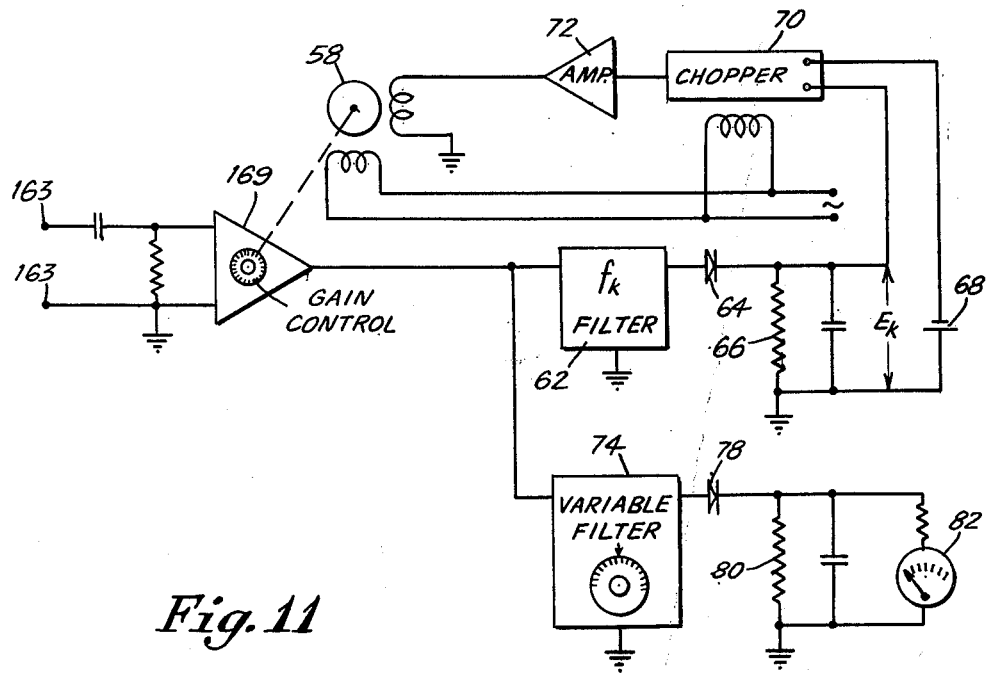
Figure 12:
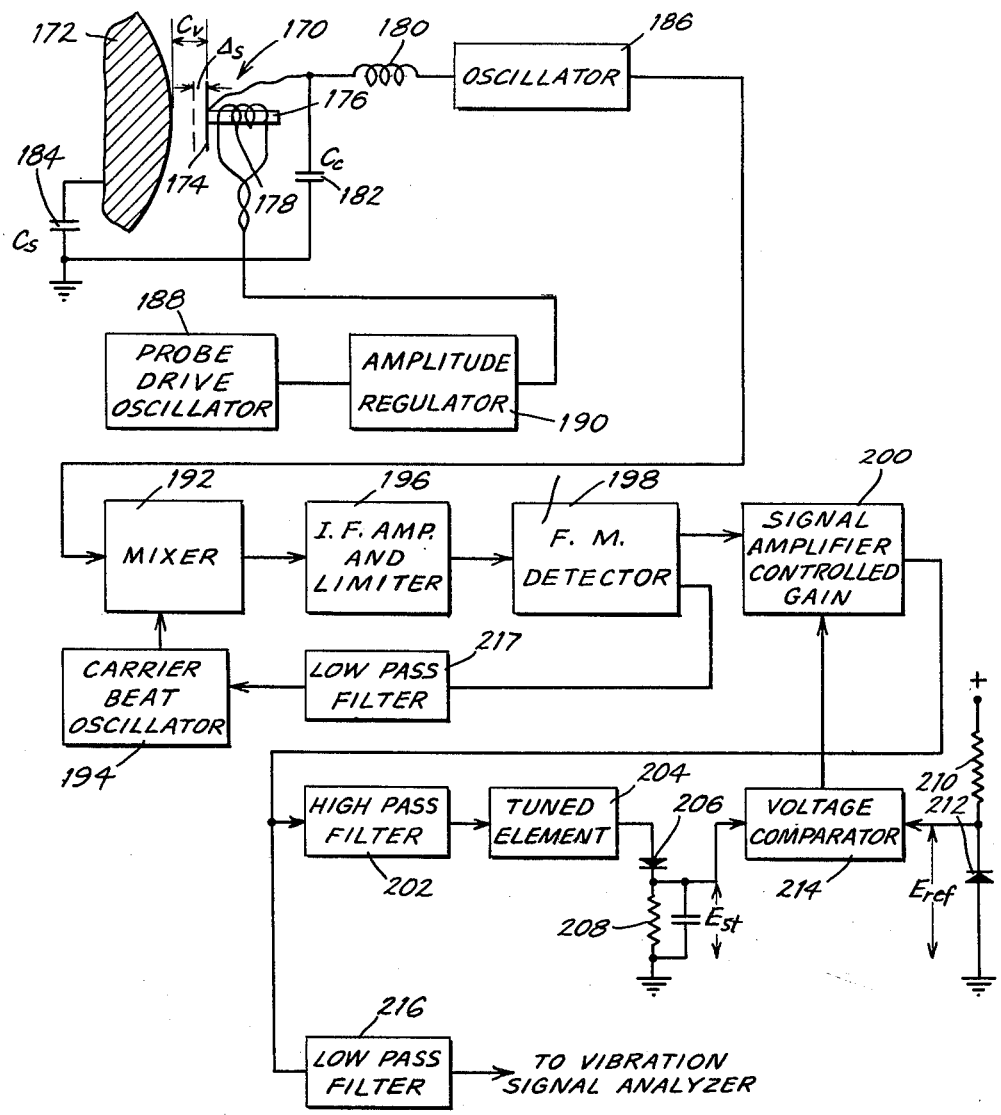
Figure 13:
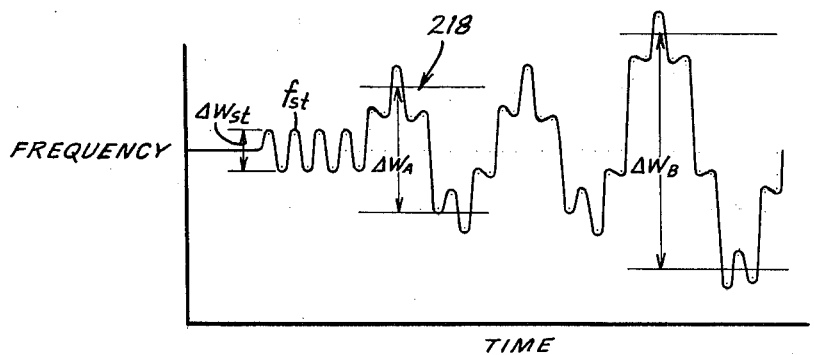
Figure 14:
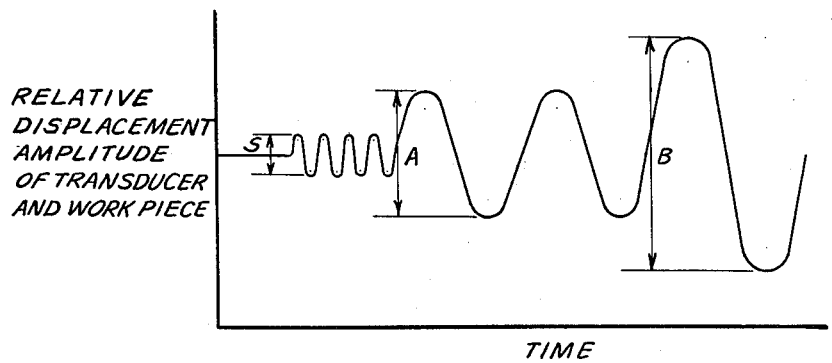

FIGURE 8 is a vertical elevation showing the use of a different type of energy in a transducing system constructed according to the present invention;

FIGURE 9 is a circuit diagram showing one possible connection of the transducer of FIGURE 8 according to the invention;

FIGURE 10 is a vertical elevation showing a transducer utilizing still another type of energy according to the invention;

FIGURE 11 is a circuit diagram showing one possible connection of the transducer arrangement of FIGURE 10 according to the invention;

FIGURE 12 is a diagrammatic illustration of another form of transducer system constructed according to the invention;

FIGURE 13 is a graph depicting the signals produced by the transducer of FIGURE 12; and FIGURE 14 is a graph depicting the displacements which produce the signals of FIGURE 13.

Figure 1:
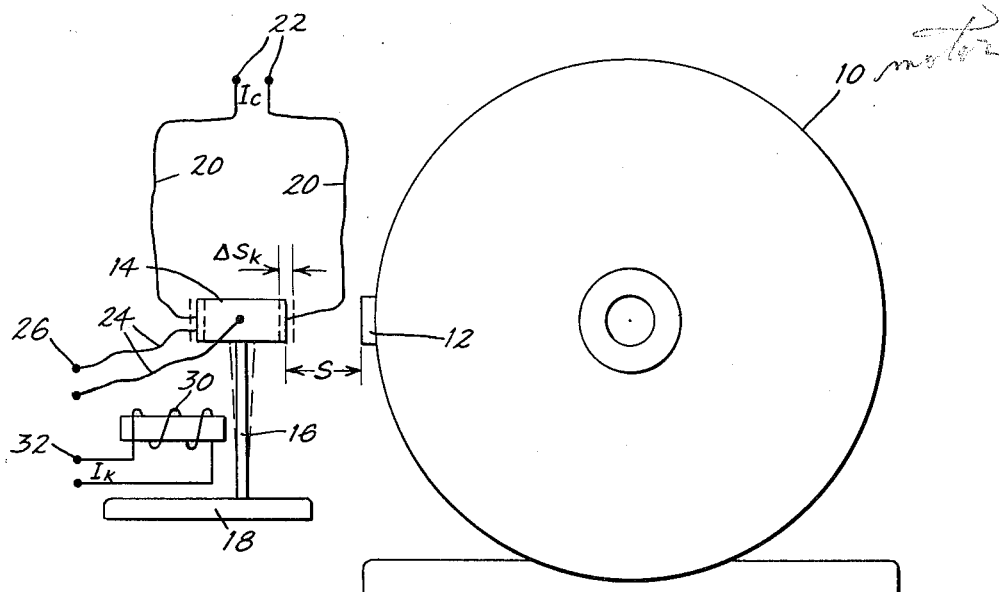
FIGURE 1 is a vertical elevation showing a non-contacting vibration transducer mounted for calibration and standardization according to the present invention.
Figure 3:
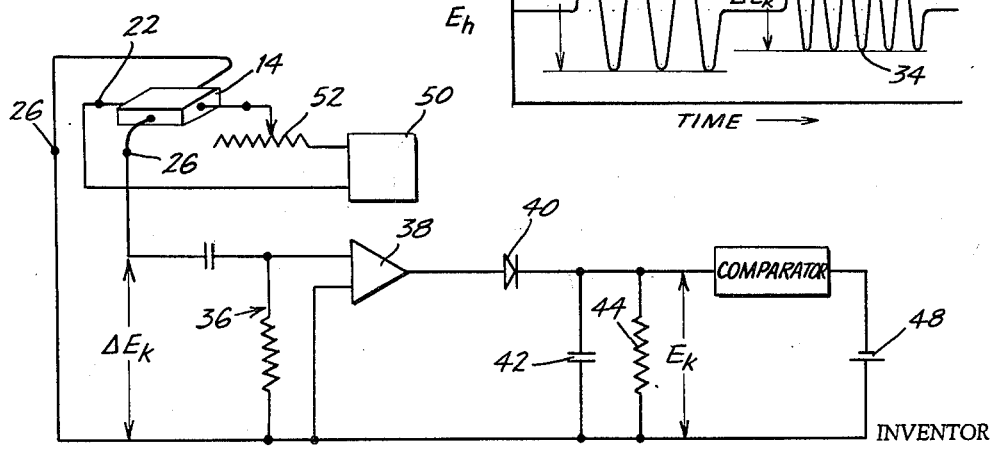
FIGURE 3 is a circuit diagram showing the connection of the transducer of FIGURE 1 according to one embodiment of the invention.

Referring to the figures of the drawings, and more particularly to FIGURES 1 and 3, the wave or field energy sensitive unit of the transducer may comprise a device commonly known as a Hall effect generator. This is a solid state multiplying device which has only recently become commercially available. The operation of the device is predicated on the discovery that when any material is conducting a current and has a magnetic field passing through it, a voltage is developed across the material in a direction perpendicular to both the input current and the magnetic field. The input current flow, the magnetic field and the resultant output voltage are mutually perpendicular to one another and the output voltage, hereafter referred to as the Hall voltage, is a function of both the input current and the magnetic field. The linearity of the Hall voltage differs with respect to each of the two inputs (current and magnetic field intensity) but a large degree of linearity can be obtained through proper attention to choice of the Hall element and the circuit environment. Further details of Hall effect generators are presented in an article in the March 4, 1959 issued of "Electronic Design."

Referring now to FIGURE 1, there is shown a motor or other rotating piece of equipment 10 whose vibration it is desired to study. Attached to one side of the housing of this motor is a small permanent magnet 12 which may be held to the motor housing by its own magnetic attraction for the material of the housing. A Hall effect generator 14 is mounted adjacent magnet 12 on a support 16 carried by a standard 18. The standard 18 should preferably be mounted so that it does not transmit vibration of the motor 10 to the Hall generator.

An excitation current is fed to the Hall generator 14 through suitable flexible leads 20 which terminate at the excitation terminals 22. The Hall voltage is taken from the generator 14 by means of flexible leads 24 which are connected to terminals 26.

Figure 2:
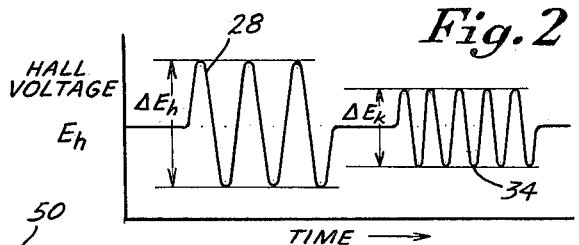
FIGURE 2 is a graphical depiction of the signals produced by the transducer of FIGURE 1.

The Hall generator 14 lies within the magnetic field produced by the permanent magnet 12 and, under static conditions, will produce a Hall voltage which is indicated as $E_h$ in FIGURE 2. If now the motor 10 is run and vibrates, the magnet 12 moves toward and away from the Hall generator 14 thereby increasing and decreasing the magnetic field to which the generator is subjected and causing a variation in the Hall voltage which is indicated at 28 in FIGURE 2. The magnitude and wave shape of this voltage is a function of the amplitude and wave shape of the vibration and can be subjected to analysis by means of conventional vibration analyzing equipment.

According to the invention, the support 16 upon which the Hall generator 14 is mounted is formed of ferro-magnetic material which is resilient in order to permit transverse movement of the generator as indicated by the broken lines in FIGURE 1. A solenoid 30 is provided adjacent the support 16 and has its coil connected to the terminals 32. If a pulsating current is now fed to the terminals 32 of solenoid 30 the support 16 and Hall generator 14 will be caused to vibrate to move the generator closer to and further away from the magnet 12 thereby producing an alternating current output which is indicated at 34 in FIGURE 2 and which will be called the standardization voltage.

Assuming the Hall generator 14 to be spaced from the magnet 12 by a displacement S, energization of the solenoid 30 produces a variation in displacement equal to $\Delta S_k$ and the alternating Hall voltage is a function of $\Delta S_k$. If the value of the displacement $\Delta S_k$ is known it is then possible to compute the calibration coefficient according to the relationship:

$$\Delta E_k / \Delta S_k = C$$

The value of C constitutes a calibration coefficient which relates the amount of displacement between the work piece and the Hall generator in terms of the output voltage produced. This calibration coefficient can have any value and will depend upon the distance S, the magnitude of the excitation current, the strength of the magnetic field and the conversion efficiency of the Hall generator. Closer spacing will produce higher values with the maximum usable value being determined by the allowable minimum signal to noise ratio of the Hall voltage. Because the Hall voltage is a function of so many variables, standardization is essential and it is in providing this standardization that the arrangement of FIGURE 1 is found advantageous and productive of a number of unexpected results.

Referring to FIGURE 3, the Hall generator 14 has its Hall voltage terminals 26 connected through a suitable coupling network 36 to the input of an amplifier 38. The output of amplifier 38 is fed to a rectifying device 40 which develops a direct current voltage across a parallel connected capacitor 42 and resistor 44. A suitable voltage comparator 46 is connected to compare the voltage across resistor 44 and the voltage of a reference voltage source 48. The excitation current terminals 22 of the Hall generator 14 are connected to an excitation current source 50 through a variable resistance 52 capable of adjusting the flow of excitation current $I_c$.

If a pulsating standardization current $I_k$ is now fed to the solenoid 30 the resulting vibration $\Delta S_k$ of the Hall generator 14 produces a calibrating and standardizing voltage $\Delta E_k$ which is fed to the amplifier 38 to produce a direct current voltage $E_k$ across the resistor 44. This voltage $E_k$ is then compared to the reference voltage source 48 and either the spacing S or the excitation current $I_c$ may be varied to bring the value of $E_k$ to that of the reference voltage. The foregoing adjustment is made with the motor 10 at rest. Assuming that the calibration coefficient C is determined when the voltage $E_k$ is equal to the reference voltage, it is now possible to utilize the transducer system to measure and analyze various unknown vibrations without further calibration. Thus, when a vibration is to be analyzed, the solenoid 30 is energized with the standardizing current $I_k$ and the variable resistor 52 in the excitation current circuit is varied to bring the voltage $E_k$ into equalization with the reference voltage 48. Once this is done, the standardization current $I_k$ to the solenoid can be removed and the stationary Hall generator used to measure and analyze the vibration of the piece under study. It will be appreciated that with this arrangement neither the intensity of the magnetic field produced by magnet 12 nor the distance S is critical so long as the mounting of the transducer is not disturbed after calibration is effected. According to this invention, however, it is desired to eliminate such a relationship or dependence and a system for accomplishing this end is shown in FIGURE 4.

Figure 4:
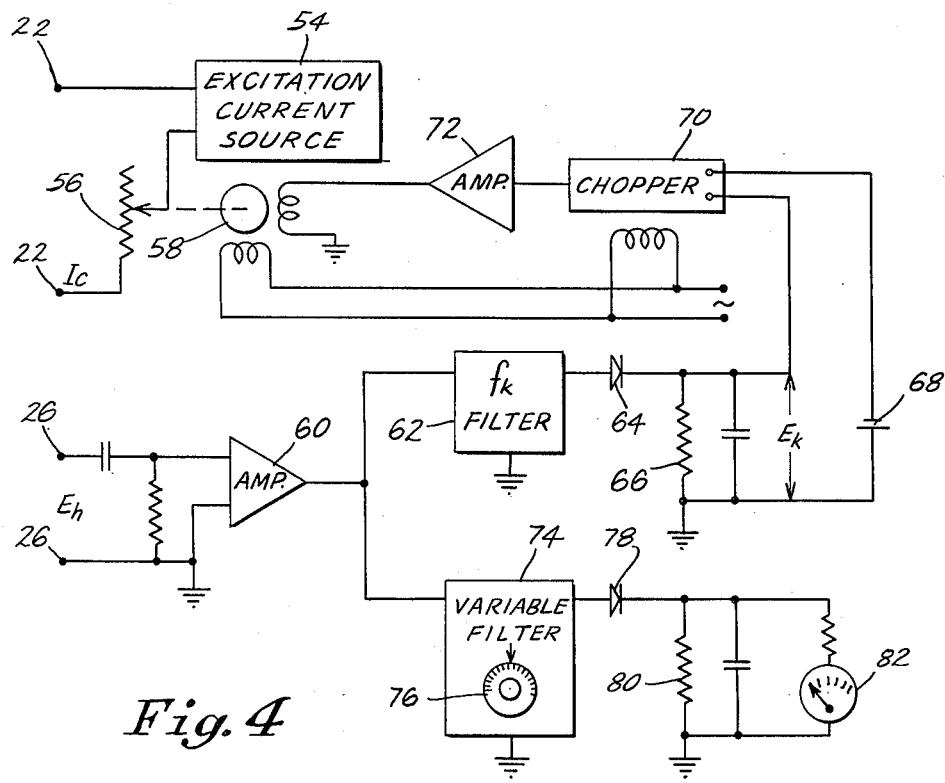
FIGURE 4 is a circuit diagram showing the transducer of FIGURE 1 connected in a circuit arranged according to another embodiment of the invention.

Referring now to FIGURE 4, and utilizing a test setup similar to that shown in FIGURE 1, the excitation terminals 22 of the Hall generator are connected to an excitation current source 54 through a variable resistor 56 whose movable arm is positioned by a servo-motor 58. The Hall voltage $E_h$ is fed from terminals 26 into amplifier 60. The output of this amplifier is delivered to a tuned filter 62 which is adjusted to pass only the signal $f_k$ generated as a function of the standardization motion of the Hall generator in response to the energization of the solenoid 30 by the standardization current $I_k$. The output of filter 62 is fed through a rectifying device 64 to produce the voltage $E_k$ across the load resistor 66. This voltage is compared to reference voltage 68 and the sum fed to the input of a chopper 70. The output of the chopper is fed through the amplifier 72 to the servo-motor 58 and controls the servo-motor in a conventional manner. This is to say, when the voltage $E_k$ developed across resistance 66 is equal to the reference voltage 68, the servo-motor 58 remains stationary and the excitation current $I_c$ remains unchanged. If the voltage $E_k$ varies above or below the reference voltage 68, however, the servo-motor 58 drives the movable arm of the variable resistor 56 to modify the value of the excitation current $I_c$ to return the voltage $E_k$ to equality with the reference voltage 68.

The amplifier 60 which receives the Hall voltage also delivers an output to a variable filter 74 which is capable of being tuned by control 76 to select the particular frequency of vibration which is to be analyzed. The output of this filter is fed through a rectifying device 78 to a load resistor 80 and its value is indicated by means of an amplitude meter 82 which may be calibrated in terms of vibration displacement by means of the calibration coefficient of the transducer system which has previously been determined.

Figure 5:
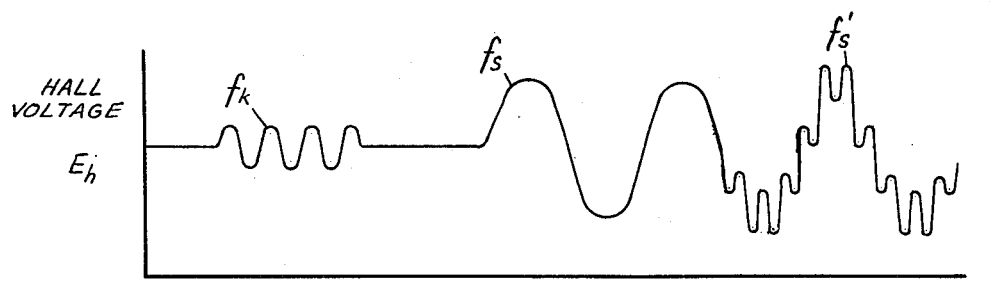
FIGURE 5 is a graphical depiction of the signals produced in the transducer system of FIGURE 4.

Referring to FIGURE 5, there is shown a diagrammatic depiction of the output of the Hall effect generator. When both the generator and the object under study are at rest the generator produces the Hall effect voltage $E_h$. When the generator is caused to vibrate by means of the solenoid 30 of FIGURE 1 the voltage $f_k$ is produced. If the Hall generator is stationary and the object under study is caused to vibrate, the vibration signal $f_s$ is produced. When both the Hall generator and the object under study are vibrating, these signals $f_k$ and $f_s$ are mixed to produce a resultant signal $f'_s$. Although the frequency of the standardizing signal $f_k$ is not critical, it should preferably be outside the range of frequencies of interest in the object under study or, if within this range, it should be at a value which is not expected to be a frequency of vibration. It will be appreciated that the particular circuit illustrated is not critical and that other equivalent circuits might also be used.

Figure 6:
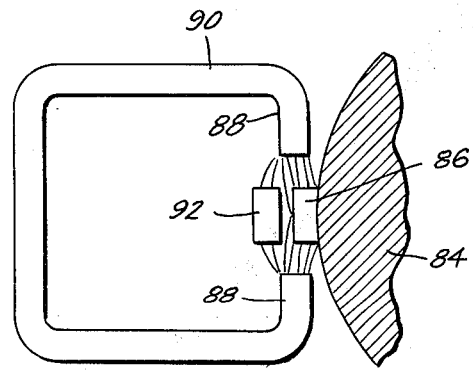
FIGURE 6 shows another embodiment of transducer capable of being used in the arrangements of FIGURES 1 through 5.

While FIGURE 1 illustrates an arrangement wherein the Hall generator is actuated by means of a permanent magnet, it will be appreciated by those skilled in the art that other methods of actuating the generator are also possible. Referring to FIGURE 6, there is shown one such alternative arrangement. A work piece 84 has attached thereto a magnetically permeable element 86 which is disposed between poles 88 of a C-shaped permanent magnet 90. The magnetic flux emanating from these poles passes through the permeable element 86 so that when the element 86 vibrates the field reaching the Hall generator 92 is modified. While the magnet 90 is shown as a permanent magnet, it is also possible to use an electro magnet excited by either direct or alternating current. In the event alternating current excitation is used, suitable demodulation and filtering circuits will be necessary in the signal circuit utilizing the Hall voltage.

Figure 7:
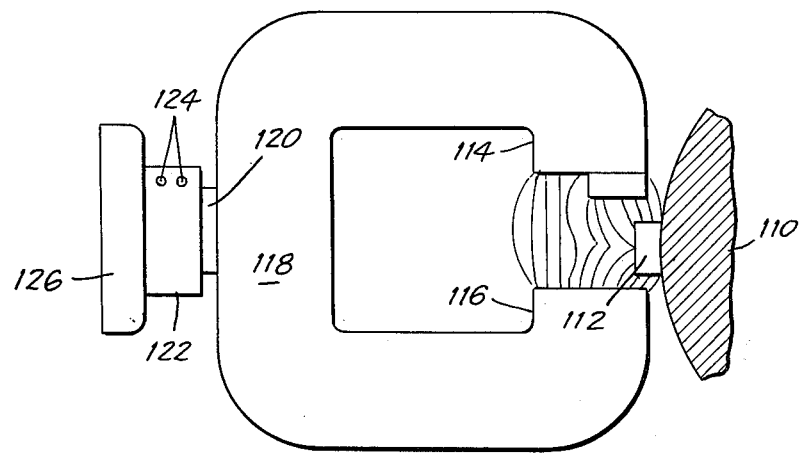
FIGURE 7 shows a still further transducer system arrangement capable of accomplishing calibration and standardization according to the present invention.

Referring to FIGURE 7 there is shown still another arrangement of a Hall effect generator according to the invention wherein the Hall generator is mounted rigidly at the pole piece of the magnet producing the field energy. An object 110 whose vibration is to be studied has affixed thereto a magnetically permeable member 112 which extends between the poles 114 and 116 of a C-shaped permanent magnet 118. The magnet 118 is carried by the armature 120 of a solenoid 122 having excitation terminals 124. The solenoid 122 is mounted on a base 126. A Hall generator 130 is mounted on the pole 114.

According to this embodiment of the invention, there is no relative motion between the Hall generator and the magnet. It will be apparent, however, that when the member 112 moves in relation to the Hall generator 130 and poles 114 and 116 either in response to its own vibration or as a function of the vibration of the magnet 118, the magnetic field encompassing the Hall generator is changed to produce the desired signal voltages.

While a Hall generator constitutes a very convenient energy sensitive device for the transducer system of this invention, neither the Hall generator nor the magnetic field is essential as the source of signals. Any type of wave or field energy may be utilized and arrangements for using different types of such energy will now be described.

Referring to FIGURE 8, there is shown a vibrating object 132 with a transducer arrangement 134 in proximity thereto. The transducer 134 consists of a light source 136 mounted on a resilient ferro-magnetic rod 142 similar to those utilized and described in connection with the preceding embodiments of the invention. The rod 142 is mounted on a base 138 and carries a light sensitive element such as a photocell or photomultiplier 140. A solenoid 144 may be provided adjacent the rod 142 for vibrating the light and photo-tube upon application of standardization current to the terminals 146 of the solenoid. The output of the light sensitive device 140 is connected to terminals 148 through suitable flexible leads.

Referring now to FIGURE 9, there is shown a standardizing arrangement of a continuous and automatic type similar to that illustrated in FIGURE 5. Similar reference numerals are utilized where appropriate. In this embodiment of the invention the variable resistor 56 which is adjusted by the servo-motor 58 is connected to the filament energizing circuit of the lamp or light source 136 so as to adjust the intensity of its light radiation. Variation of this light intensity produces a variation in the output of the light sensitive device 140 and the operation of this embodiment of the invention is identical to that illustrated in FIGURES 4 and 5.

Referring to FIGURES 10 and 11 there is shown still another embodiment of the invention which requires no source of energy other than the object to be investigated. According to this embodiment a vibrating object 150 is disposed adjacent a transducer 152 which consists of an infrared sensitive device 162 such as a thermopile. The infrared detector 162 detects the infrared radiation from the object 150 and delivers an output signal to a pair of terminals 163. The infrared radiation detector is mounted on flexible ferro-magnetic rod 164 adapted to move under the influence of solenoid 166 when the terminals 168 of the solenoid coil are connected to a standardization current source. The output of the detector 162 at terminals 163 is fed to a variable gain amplifier 169 which has its gain controlled by a servo-motor 58 in FIGURE 11.

The transducer system of FIGURE 11 is otherwise connected in a manner similar to that illustrated in FIGURES 4 and 9 and like reference numerals have been used where appropriate.

When both the object under study 150 and radiation detector 162 are at rest the infrared radiation from the object will cause the radiation detector to generate a voltage similar to the "at rest" Hall voltage $E_h$ described in connection with FIGURES 4 and 5. When either the object or the radiation detector, or both, are vibrated, an alternating current signal is produced. In this particular embodiment of the invention the operation of the circuitry is similar to that described in connection with FIGURE 4 except that, in this instance, the servo-motor 58 effects standardization of the transduced by varying the gain of amplifier 169. The operation of this unit is otherwise similar so that further explanation is unnecessary.

Referring now to FIGURES 12 through 14, there is shown still another embodiment of the invention, utilizing an electrostatic field as the energy for creating the transducer output signal. A transducer, generally indicated at 170, is disposed adjacent a vibrating object 172, whose vibration is to be studied. The transducer 170 consists of a capacitor plate 174 affixed to the armature 176 of a solenoid 178. The plate 174 is connected to an inductance 180 and to a grounded capacitor 182. The object or work piece under study, 172, exhibits a capacitance to ground indicated by the capacitor 184. The tuned circuit which is formed by the inductance 180 and capacitors 182 and 184 and the capacitance between the plate 174 and work piece 172 are utilized as the frequency determining circuit in an oscillator 186.

When the object or work piece 172 vibrates, the distance between the work piece and the plate 174 varies and this changes the value of the capacitance in the frequency determining circuit of the oscillator 186 and causes the frequency of oscillation to vary accordingly. The circuit constants of the inductance 180 and capacitors associated therewith are so chosen that the frequency of oscillation of the oscillator 186 is preferably in the radio frequency range. The variation in frequency of the output of the oscillator 186 in response to relative displacement between the plate 174 and work piece 172 constitutes frequency modulation. The magnitude of change in generated carrier oscillator frequency (deviation) is determined by the magnitude of the relative displacement or movement between the plate 174 and work piece 172, while the rate of change of carrier frequency is determined by the frequency of the relative motion between these same two elements.

The plate 174, carried by the armature 176 is caused to vibrate by the solenoid 178 which is driven by a probe drive oscillator 188 which feeds its signal through an amplitude regulator 190. The amplitude regulator is provided to insure a constant vibration amplitude of the plate 174 of the probe. This vibration of the probe plate 174 causes a variation in the frequency of the carrier oscillator 186 with the magnitude of the change in carrier frequency being a function of the magnitude of the vibration and the rate of change of the carrier frequency being controlled by the frequency of the signal from the probe drive oscillator 188 and amplitude regulator 190.

The frequency modulated output of the carrier oscillator 186 is fed to a mixer 192 which receives a beat signal from a beat oscillator 194. The output of the mixer 192 constitutes an intermediate frequency signal which is fed to an I.F. amplifier and limiter 196 and a frequency modulation detector 198.

The F.M. detector 198 produces two outputs, one of which is fed to an implifier 200 having a controllable gain characteristic. The output of this amplifier is in turn fed through a high pass filter 202, tuned element 204, and rectifying device 206 to a load resistor 208 to produce a comparison voltage $E_{st}$. A reference voltage $E_{ref}$ is created by a positive supply voltage fed to a resistor 210 and Zener diode 212. A voltage comparator 214 compares the reference voltage with the voltage across the resistor 208 and feeds an error signal to the amplifier 200 to control the gain thereof in order to maintain an equality between these two voltages.

The output of the amplifier 200, in addition to being fed to the high pass filter 202, is also fed to a low pass filter 216 and thence to a vibration signal analyzer or other indicating device and this constitutes the desired output of the system. It has been stated tha tthe F.M. detector 198 provides two outputs, and it has been explained that one of these outputs is fed to the amplifier 200. The other output is fed through a low pass filter 217 to beat oscillator 194 and is similar to the signal which has been used heretofore in automatic frequency control circuits in superheterodyne radio receivers. The filter 217 has a cut-off frequency below the lowest frequency of vibration which it is desired to analyze.

The operation of this system is as follows: The vibration of the probe plate 174 under the influence of the probe drive oscillator 188 causes frequency modulation of the signal of oscillator 186 at a frequency $f_{st}$ determined by the probe drive oscillator 188 and having a magnitude of frequency variation or deviation dependent upon the amplitude of vibration or the amplitude of the signal from the probe drive oscillator. This is indicated graphically as $\Delta\omega_{st}$ in FIGURE 13. The displacement of the plate 174 which causes this signal is shown at S in FIGURE 14. If the work piece 172 now vibrates through a displacement indicated at A in FIGURE 14, the frequency modulation signal caused by the vibration of the probe plate 174, indicated at $f_{st}$ in FIGURE 13, is superimposed on a frequency modulation signal caused by the displacement variation A. This composite signal is indicated at 218 in FIGURE 13. The frequency deviation due to the displacement variation A of FIGURE 14 is indicated at $\Delta\omega_A$ in FIGURE 13. For a larger vibration or displacement, such as illustrated at B in FIGURE 14, a larger frequency deviation of the composite signal occurs as is indicated as $\Delta\omega_B$ in FIGURE 13.

The complex frequency modulated signal indicated in FIGURE 13 is fed to the mixer 192. The beat oscillator 194 preferably operates at a radio frequency which produces an intermediate frequency signal which is also at a radio frequency. As one example, the oscillator 186 may have a center frequency of 5 megacycles while the beat oscillator 194 may operate at 15 megacycles to produce an intermediate frequency signal of 10 megacycles. The vibration under study is generally at a frequency in the audio range and the frequency of the probe drive oscillator is also in this range but higher than the highest vibration frequency likely to be encountered.

The F.M. detector 198 produces complex audio frequency signals which are fed to the amplifier 200 and thence to the filters 202 and 216. The high pass filter 202 segregates the calibration signal created by the vibration of the probe plate 174 and this is utilized to control the gain of the amplifier 200 to obtain constant and continuous calibration. The low pass filter 216 segregates the vibration signal or signals which are created by the vibration of the work piece, and these may be fed to any suitable vibration signal analyzer. The cutoff frequency of the high pass filter 202 is sufficiently high to be considerably greater than the highest vibration signal frequency which is to be studied. The cut-off frequency of the low pass filter is higher than the maximum vibration signal under study, but lower than the frequency of the probe drive oscillator 188.

The automatic frequency control error signal from the F.M. detector 198 is fed to the carrier beat oscillator and varies its frequency of oscillation to maintain the I.F. center frequency constant. This compensates for variations in the distance of the probe 170 from the work piece 172, thereby making it possible to utilize a hand-carried probe. The significance of this feature of this embodiment of the invention will be readily apparent to those skilled in the art when it is realized that a non-contacting pickup is provided which need only be directed at the vibrating body in proximity thereto. While this result is accomplished in the illustrated embodiment by control of the beat oscillator frequency it is also possible to use a discriminator and control the center frequency of the oscillator 186 to achieve the same results. The low pass filter 217, or its equivalent, is necessary in order to prevent the automatic frequency control circuit from cancelling the effect of the vibration itself.

While the embodiment of the invention illustrated in FIGURES 12 through 14 shows an electrostatic capacitive probe it is to be understood that this system may be used with any type of probe capable of controlling the frequency of the oscillator 186. As an example, the probe may also consist of an inductor whose inductance is modified by a variation in magnetic field caused by vibration of the object under study. This variation in magnetic field can be achieved in any of the ways illustrated in FIGURES 1, 6 and 7 and in additional ways which will be apparent to those skilled in the art. Such a magnetic field may be used to vary the tuning of the frequency determining circuit of the oscillator 186 or may be used in conjunction with a Hall generator to produce a Hall voltage which is utilized to frequency modulate the oscillator in any conventional manner. Alternatively, the voltages produced by the probes of FIGURES 8 and 10 may also be used in a similar manner.

It will be apparent from the foregoing that the transducer systems of this invention provide a powerful vibration analysis tool which eliminates most of the disadvantages and limitations encountered with prior systems. Not only is the probe element of a non-contacting nature, it is completely self-calibrating on a continuous basis independent of the peculiarities of the particular vibration under investigation. Probes of numerous different types may be utilized thereby adapting the system to wide variations in environmental conditions. In its broadest aspect the detector element of the transducer is sensitive to energy existing in space and this energy may be created by an energy source which forms a part of the transducer or may be created by the object under study. Where the energy is created and radiated by the transducer it is not necessary that the energy returned to the detector be of the same frequency or wavelength. As an example white light may be radiated and monocolored light may be returned. Other examples will be obvious to those skilled in the art and are embraced within the scope of the invention. The carrier system of the invention is of unusual value, particularly in the superheterodyne embodiment which provides wide ranges of sensitivity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. A non-contacting displacement transducer system comprising transducer means adapted to be disposed in proximity to an object subject to displacement, said transducer means being sensitive to a variation in energy existing in space, said variation in said energy being caused by relative displacement between said transducer means and said object, said transducer means producing an electrical output signal which is a function of said variation in said energy, said transducer means including adjusting means for changing the functional relationship between said variation in energy and said electrical output signal, means for causing a cyclic variation in relative displacement of predetermined amplitude and frequency between said transducer means and said object whereby said transducer means produces a calibrating electrical output signal, means coupled to said transducer means for distinguishing between said output signals, and means responsive to said calibrating electrical output signal and connected to said adjusting means for maintaining a constant functional relationship between relative displacement between said object and said transducer means and said electrical output signal of said transducer means.

2. A non-contacting displacement transducer system comprising transducer means adapted to be disposed in proximity to an object subject to displacement, said transducer means being sensitive to a variation in energy existing in space, said variation in said energy being caused by relative displacement between said transducer means and said object, said transducer means producing an electrical output signal which is a function of said variation in said energy, said transducer means including adjusting means for changing the functional relationship between said variation in energy and said electrical output signal, means for causing a cyclic variation in relative displacement of predetermined amplitude and frequency between said transducer means and said object whereby said transducer means produces a calibrating electrical output signal, means coupled to said transducer means for distinguishing said calibrating output signal, means for generating a reference signal, comparing means for comparing said calibrating output signal and said reference signal, said comparing means producing a control signal connected to said adjusting means for maintaining a constant functional relationship between relative displacement between said object and said transducer means and said electrical output signal of said transducer means.

3. A non-contacting displacement transducer system comprising transducer means adapted to be disposed in proximity to an object subject to displacement, said transducer means being sensitive to a variation in energy existing in space, said variation in said energy being caused by relative displacement between said transducer means and said object, said transducer means producing an electrical output signal which is a function of said variation in said energy, said transducer means including adjusting means for changing the functional relationship between said variation in energy and said electrical output signal, means for causing a cyclic variation in relative displacement of predetermined amplitude and frequency between said transducer means and said object whereby said transducer means produces a calibrating electrical output signal, filter means for separating said calibrating electrical output signal from electrical output signals caused by displacement of said object, and means responsive to said calibrating electrical output signal and connected to said adjusting means for maintaining a constant functional relationship between relative displacement between said object and said transducer means and said electrical output signal of said transducer means.

4. A non-contacting displacement transducer system comprising transducer means adapted to be disposed in proximity to an object subject to displacement, said transducer means being sensitive to a variation in energy existing in space, said variation in said energy being caused by relative displacement between said transducer means and said object, said transducer means producing an electrical output signal which is a function of said variation in said energy, said transducer means including adjusting means for changing the functional relationship between said variation in energy and said electrical output signal, means for causing a cyclic variation in relative displacement of predetermined amplitude and frequency between said transducer means and said object whereby said transducer means produces a calibrating electrical output signal, filter means for separating said calibrating electrical output signal from electrical output signals caused by displacement of said object, means for generating a reference signal, comparing means coupled to said filter means and to said reference signal generator means for comparing said calibrating output signal and said reference signal, said comparing means producing a control signal connected to said adjusting means for maintaining a constant functional relationship between relative displacement between said object and said transducer means and said electrical output signal of said transducer means.

5. A non-contacting vibration transducer system comprising transducer means adapted to be disposed in proximity to an object subject to vibration, said transducer means being sensitive to a variation in energy existing in space, said variation in said energy being caused by relative displacement between said transducer means and said object, said transducer means producing an alternating current signal which is a function of said variation in energy, said transducer means including adjusting means for varying the amplitude of alternating current signal produced by a given variation in said energy, means for causing a cyclic variation in relative displacement of a predetermined amplitude and frequency between said transducer means and said object whereby said transducer means produces an alternating current calibrating signal, filter means for separating said calibrating signal from output signals caused by vibration of said object, rectifying means for rectifying said calibrating signal, means for generating a direct current reference voltage, comparing means for comparing said reference voltage and said rectified calibrating signal, said comparing means producing a control signal connected to said adjusting means for maintaining a constant functional relationship between vibration of said object and the output signal of said transducer means.

6. A non-contacting vibration transducer system comprising transducer means adapted to be disposed in proximity to an object subject to vibration, said transducer means being sensitive to a variation in energy existing in space, said variation in said energy being caused by relative displacement between said transducer means and said object, said transducer means producing an alternating current signal which is a function of said variation in energy, said transducer means including adjusting means for varying the amplitude of alternating current signal produced by a given variation in said energy, means for vibrating at least a portion of said transducer means whereby said transducer means produces an alternating current calibrating signal, filter means for separating said calibrating signal from output signals caused by vibration of said object, rectifying means for rectifying said calibrating signal, means for generating a direct current reference voltage, comparing means for comparing said reference voltage and said rectified calibrating signal, said comparing means producing a control signal connected to said adjusting means for maintaining a constant functional relationship between vibration of said object and the output signal of said transducer means.

7. A non-contacting transducer system as set out in claim 1 wherein said transducer means is sensitive to variation in magnetic field, and including means for creating a magnetic field which varies at the position of said transducer means upon relative displacement between said transducer means and said object.

8. A non-contacting transducer system as set out in claim 7 wherein said transducer means comprises a Hall effect generator.

9. A non-contacting transducer system as set out in claim 8 wherein said adjusting means comprises means for adjusting the exciting current of said Hall generator.

10. A non-contacting displacement transducer system comprising a Hall generator adapted to be disposed in a magnetic field variable in accordance with the relative displacement of said generator from an object subject to displacement, said Hall generator having excitation terminals and Hall voltage terminals, said Hall generator producing at said Hall voltage terminals a Hall output voltage which is a function of the variation in said magnetic field, means for vibrating said Hall generator relative to said object whereby a calibrating Hall voltage is produced, means for distinguishing said calibrating voltage, and means coupled to said distinguishing means and responsive to said calibrating voltage and connected to said excitation terminals for maintaining a constant relationship between the Hall voltage and the relative displacement between said Hall generator and said object.

11. A non-contacting displacement transducer system comprising a Hall generator adapted to be disposed in a magnetic field variable in accordance with the relative displacement of said generator from an object subject to displacement, said Hall generator having excitation terminals and Hall voltage terminals, said Hall generator producing at said Hall voltage terminals a Hall output voltage which is a function of the variation in said magnetic field, solenoid means for vibrating said Hall generator relative to said object whereby a calibrating Hall voltage is produced, means for distinguishing said calibrating voltage, power supply means for feeding a cyclic energizing current of constant frequency and amplitude to said solenoid means to insure constancy of said calibrating voltage, and means coupled to said distinguishing means and responsive to said calibrating voltage and connected to said excitation terminals for maintaining a constant relationship between the Hall voltage and the relative displacement between said Hall generator and said object.

12. A non-contacting displacement transducer system comprising a Hall generator adapted to be disposed in a magnetic field variable in accordance with the relative displacement of said generator from an object subject to displacement, said Hall generator having excitation terminals and Hall voltage terminals, solenoid means for vibrating said Hall generator relative to said object whereby a calibrating Hall voltage is produced, power supply means for feeding a cyclic energizing current of constant frequency and amplitude to said solenoid means to insure constancy of said calibrating voltage, filter means connected to the output of said Hall generator for separating said calibrating voltage from voltages produced by displacement of said object, and means responsive to said calibrating voltage and connected to said excitation terminals for maintaining a constant relationship between the Hall voltage and the relative displacement between said Hall generator and said object.

13. A non-contacting displacement transducer system comprising a Hall generator adapted to be disposed in a magnetic field variable in accordance with the relative displacement of said generator from an object subject to displacement, said Hall generator having excitation terminals and Hall voltage terminals, solenoid means for vibrating said Hall generator relative to said object whereby a calibrating Hall voltage is produced, power supply means for feeding a cyclic energizing current of constant frequency and amplitude to said solenoid means to insure constancy of said calibrating voltage, filter means connected to the output of said Hall generator for separating said calibrating voltage from voltages produced by displacement of said object, a source of reference voltage, comparator means connected to compare the calibrating voltage from said filter and said reference voltage, and means actuated by an error signal from said comparator means for maintaining a constant relationship between the Hall voltage and the relative displacement between said Hall generator and said object.

14. A non-contacting transducer system as set out in claim 1 wherein said transducer means is sensitive to variation in radiant energy, and including means for generating radiant energy which varies at the position of said transducer means upon relative displacement between said transducer means and said object.

15. A non-contacting transducer system as set out in claim 6 wherein said transducer means is sensitive to variation in light energy and includes means for generating light energy which varies at the position of said transducer means upon relative displacement between said transducer means and said object, said means for generating light energy being mounted for vibration with said transducer means.

16. A non-contacting transducer system as set out in claim 15 wherein said means for generating light energy comprises a lamp, and said adjusting means comprises means for adjusting the energizing current of said lamp.

17. A non-contacting displacement transducer system comprising a photo-electric device adapted to be disposed in proximity to an object subject to displacement, a light source mounted in proximity to said photo-electric device so that on displacement of said object said photoelectric device produces an output voltage which is a function of the displacement of said object, means for vibrating said photo-electric device and light source relative to said object whereby a calibrating voltage is produced by said photo-electric device, means coupled to said photo-electric device for distinguishing said calibrating voltage, means for energizing said light source, and means coupled to said distinguishing means and responsive to said calibrating voltage and connected to said energizing means for maintaining a constant relationship between the voltage produced by said photo-electric device and the relative displacement between the photo-electric device and said object.

18. A non-contacting transducer system according to claim 1 wherein said transducer means is sensitive to variation in infrared radiation generated by said object.

19. A non-contacting transducer system as set out in claim 6 wherein said transducer means is sensitive to variation in infrared radiation generated by said object.

20. A non-contacting transducer system as set out in claim 1 wherein said transducer means is sensitive to an electrostatic field, and including means for creating an electrostatic field which varies at the position of said transducer means upon relative displacement between said transducer means and said object.

21. A non-contacting transducer system as set out in claim 1 including a tuned circuit in said transducer means, a capacitor probe connected in said tuned circuit, said transducer means including means for generating said output signal having a variable characteristic controlled by said tuned circuit, said variable characteristic varying as a function of the relative displacement between said probe and said object.

22. A non-contacting displacement transducer system comprising a tuned circuit having one element thereof adapted to be disposed in proximity to an object subject to displacement, signal generating means associated with said tuned circuit for generating a signal at a frequency determined by said tuned circuit whereby the frequency of said generated signal is a function of the relative spacing of said object and said element, means for causing a cyclic variation in relative displacement between said element and said object whereby said generating means produces a calibrating output signal, amplifier means having adjustable gain coupled to the output of said signal generating means, means for distinguishing said calibrating signal coupled to said amplifier means, and means coupled to said distinguishing means and responsive to said calibrating signal and connected to said amplifier means for adjusting the gain thereof to maintain a constant functional relationship between relative displacement between said object and said element and the output signal of said amplifier means.

23. A non-contacting displacement transducer system comprising signal generating means having a frequency determining element thereof adapted to be disposed in proximity to an object subject to displacement whereby relative displacement between said element and object causes a variation in energy at said element which controls the frequency of the signal produced by said signal generating means, means for causing a cyclic variation in relative displacement between said element and said object whereby said generating means produces a calibrating output signal, amplifier means having adjustable gain coupled to the output of said signal generating means, means coupled to said amplifier means for distinguishing said calibrating signal, and means coupled to said distinguishing means and responsive to said calibrating signal and connected to said amplifier means for adjusting the gain thereof to maintain a constant functional relationship between relative displacement between said object and said element and the output signal of said amplifier means.

24. A non-contacting displacement transducer system comprising signal generating means having a frequency determining element thereof adapted to be disposed in proximity to an object subject to displacement whereby relative displacement between said element and object causes a variation in energy at said element which controls the frequency of the signal produced by said signal generating means to provide frequency modulation thereof, a frequency modulation detector connected to the output of said generating means, means for causing a cyclic variation in relative displacement between said element and said object whereby said generating means and detector produces a calibrating output signal, amplifier means having adjustable gain coupled to the output of said detector, means coupled to said amplifier means for distinguishing said calibrating signal, and means coupled to said distinguishing means and responsive to said calibrating signal and connected to said amplifier means for adjusting the gain thereof to maintain a constant functional relationship between relative displacement between said object and said element and the output signal of said amplifier means.

25. A non-contacting displacement transducer system comprising signal generating means having a frequency determining element thereof adapted to be disposed in proximity to an object subject to displacement whereby relative displacement between said element and object causes a variation in energy at said element which controls the frequency of the signal produced by said signal generating means to provide frequency modulation thereof, a frequency modulation detector connected to the output of said generating means, means for causing a cyclic variation in relative displacement between said element and said object whereby said generating means and detector produces a calibrating output signal, amplifier means having adjustable gain coupled to the output of said detector, means coupled to said amplifier means for distinguishing said calibrating signal, means coupled to said distinguishing means and responsive to said calibrating signal and connected to said amplifier means for adjusting the gain thereof to maintain a constant functional relationship between relative displacement between said object and said element and the output signal of said amplifier means, and frequency control means receiving a signal from said detector and connected to maintain the mean frequency of signal fed to said detector constant.

26. A non-contacting displacement transducer system comprising signal generating means having a frequency determining element thereof adapted to be disposed in proximity to an object subject to displacement whereby relative displacement between said element and object causes a variation in energy at said element which controls the frequency of the signal produced by said signal generating means to provide frequency modulation thereof, a mixer receiving an input from said generating means, a beat oscillator feeding an input to said mixing means to produce an intermediate frequency output, a frequency modulation detector receiving said intermediate frequency output, means for causing a cyclic variation in relative displacement between said element and said object whereby said generating means and detector produces a calibrating output signal, amplifier means having adjustable gain connected to said detector, means coupled to said amplifier means for distinguishing said calibrating signal, and means coupled to said distinguishing means and responsive to said calibrating signal and connected to said amplifier means for adjusting the gain thereof to maintain a constant functional relationship between relative displacement between said object and said element and the output signal of said amplifier means.

27. A non-contacting displacement transducer system comprising signal generating means having a frequency determining element thereof adapted to be disposed in proximity to an object subject to displacement whereby relative displacement between said element and object causes a variation in energy at said element which controls the frequency of the signal produced by said signal generating means to provide frequency modulation thereof, a mixer receiving an input from said generating means, a beat oscillator feeding an input to said mixing means to produce an intermediate frequency output, a frequency modulation detector receiving said intermediate frequency output, means for causing a cyclic variation in relative displacement between said element and said object whereby said generating means and detector produce a calibrating output signal, amplifier means having adjustable gain connected to said detector, means coupled to said amplifier means for distinguishing said calibrating signal, means coupled to said distinguishing means and responsive to said calibrating signal and connected to said amplifier means for adjusting the gain thereof to maintain a constant functional relationship between relative displacement between said object and said element and the output signal of said amplifier means, and frequency control means receiving a signal from said detector and connected to vary the frequency of the signal from said beat oscillator to maintain said intermediate frequency constant.

28. A non-contacting displacement transducer comprising signal generating means having a frequency determining tuned circuit having a frequency determining capacitance and, said tuned circuit including as a part of said frequency determining capacitance a probe element adapted to be placed in proximity to an object subject to displacement whereby relative displacement between said element and said object causes a variation in the capacitance in said tuned circuit and thereby produces frequency modulation of said generating means, means for producing a cyclic variation in relative displacement between said element and said object whereby said generating means is frequency modulated, frequency modulation detector means connected to said generating means, said cyclic variation causing a calibrating signal output from said detector means, amplifier means having adjustable gain receiving the output of said detector means, means coupled to said amplifier means for distinguishing said calibrating signal, and means coupled to said distinguishing means responsive to said calibrating signal and connected to said amplifier means for adjusting the gain thereof to maintain a constant functional relationship between relative displacement between said object and said element and the output signal of said amplifier means.

29. A non-contacting displacement transducer comprising signal generating means having a frequency determining tuned circuit, said tuned circuit having a frequency determining capacitance and including as a part of said frequency determining capacitance a probe element adapted to be placed in proximity to an object subject to displacement whereby relative displacement between said element and said object causes a variation in the capacitance in said tuned circuit and thereby produces frequency modulation of said generating means, means for producing a cyclic variation in relative displacement between said element and said object whereby said generating means is frequency modulated, a mixer receiving an input from said generating means, beat oscillator means feeding an input to said mixer means to produce an intermediate frequency output, detector means receiving said output, said cyclic variation causing a calibrating signal output from said detector means, amplifier means having adjustable gain receiving the output of said detector means, means coupled to said amplifier means for distinguishing said calibrating signal, and means coupled to said distinguishing means and responsive to said calibrating signal and connected to said amplifier means for adjusting the gain thereof to maintain a constant functional relationship between relative displacement between said object and said element and the output signal of said amplifier means.

30. A non-contacting displacement transducer comprising signal generating means having a frequency determining tuned circuit, said tuned circuit having a frequency determining capacitance and including as a part of said frequency determining capacitance a probe element adapted to be placed in proximity to an object subject to displacement whereby relative displacement between said element and said object causes a variation in the capacitance in said tuned circuit and thereby produces frequency modulation of said generating means, means for producing a cyclic variation in relative displacement between said element and said object whereby said generating means is frequency modulated, a mixer receiving an input from said generating means, beat oscillator means feeding an input to said mixer means to produce an intermediate frequency output, detector means receiving said output, said cyclic variation causing a calibrating signal output from said detector means, means coupled to said amplifier means for distinguishing said calibrating signal, means coupled to said distinguishing means and responsive to said calibrating signal and connected to said amplifier means for adjusting the gain thereof to maintain a constant functional relationship between relative displacement between said object and said element and the output signal of said amplifier means, and frequency control means receiving a signal from said detector and connected to vary the frequency of the signal from said beat oscillator to maintain said intermediate frequency constant.

31. A non-contacting displacement transducer calibrating system comprising transducer means disposed in proximity to an object whose displacement is to be analyzed, said transducer being sensitive to a variation of energy existing in space, said variation in said energy being caused by relative displacement between said transducer means and said object, said transducer means producing an electrical output signal which is a function of said variation in said energy, said transducer means including adjusting means for changing the functional relationship between said variation in energy and said electrical output signal, means for causing a cyclic displacement of said transducer of predetermined amplitude and frequency whereby said transducer means produces a calibrating electrical output signal, means coupled to said transducer means for distinguishing said calibrating signal, and means coupled to said distinguishing means and responsive to said calibrating signal and connected to said adjusting means, for creating a predetermined functional relationship between relative displacement between said object and said transducer means and said electrical output signal of said transducer means.

32. A non-contacting displacement transducer system comprising transducer means adapted to be disposed in proximity to an object subject to displacement, said transducer means being sensitive to a variation in energy existing in space, said variation in said energy beng caused by relatve displacement between said transducer means and said object, said transducer means producing an electrical output signal which is a function of said variation in said energy, first means coupled to said transducer means for changing the functional relationship between said variation in energy and said electrical output signal, second means for causing a cyclic variation in relative displacement of predetermined amplitude and frequency between said transducer means and said object whereby said transducer means produces a calibrating electrical signal, means coupled to said transducer means for distinguishing said calibrating electrical signal, and third means coupled to said distinguishing means and responsive to said calibrating electrical signal for indicating when activation of said first means is necessary.

References Cited in the file of this patent

UNITED STATES PATENTS

| | | |
|---|---|---|
| 2,796,756 | Yates et al. | June 25, 1957 |
| 2,966,057 | Heller | Dec. 27, 1960 |
| 3,048,775 | Calvert | Aug. 7, 1962 |

FOREIGN PATENTS

| | | |
|---|---|---|
| 216,854 | Australia | Sept. 2, 1958 |

OTHER REFERENCES

Schacher, D. L.: Vibration Calibrator, in Instruments and Automation, vol. 30, March 1957, pages 470 and 471.

UNITED STATES PATENT OFFICE
CERTIFICATE OF CORRECTION

Patent No. 3,180,136                                                    April 27, 1965

George B. Foster

It is hereby certified that error appears in the above numbered patent requiring correction and that the said Letters Patent should read as corrected below.

Column 7, line 1, for "transduced" read -- transducer --; column 15, line 50, after "means" insert -- and --; column 16, line 25, after "means," insert -- amplifier means having adjustable gain receiving the output of said detector means, --; line 62, for "beng" read -- being --; line 63, for "relatve" read -- relative --.

Signed and sealed this 26th day of October 1965.

(SEAL)
Attest:

ERNEST W. SWIDER                                             EDWARD J. BRENNER
Attesting Officer                                                   Commissioner of Patents